Aug. 7, 1962    H. V. CHAPMAN    3,048,052
LOCKABLE ACTUATING LEVER
Filed Feb. 6, 1961
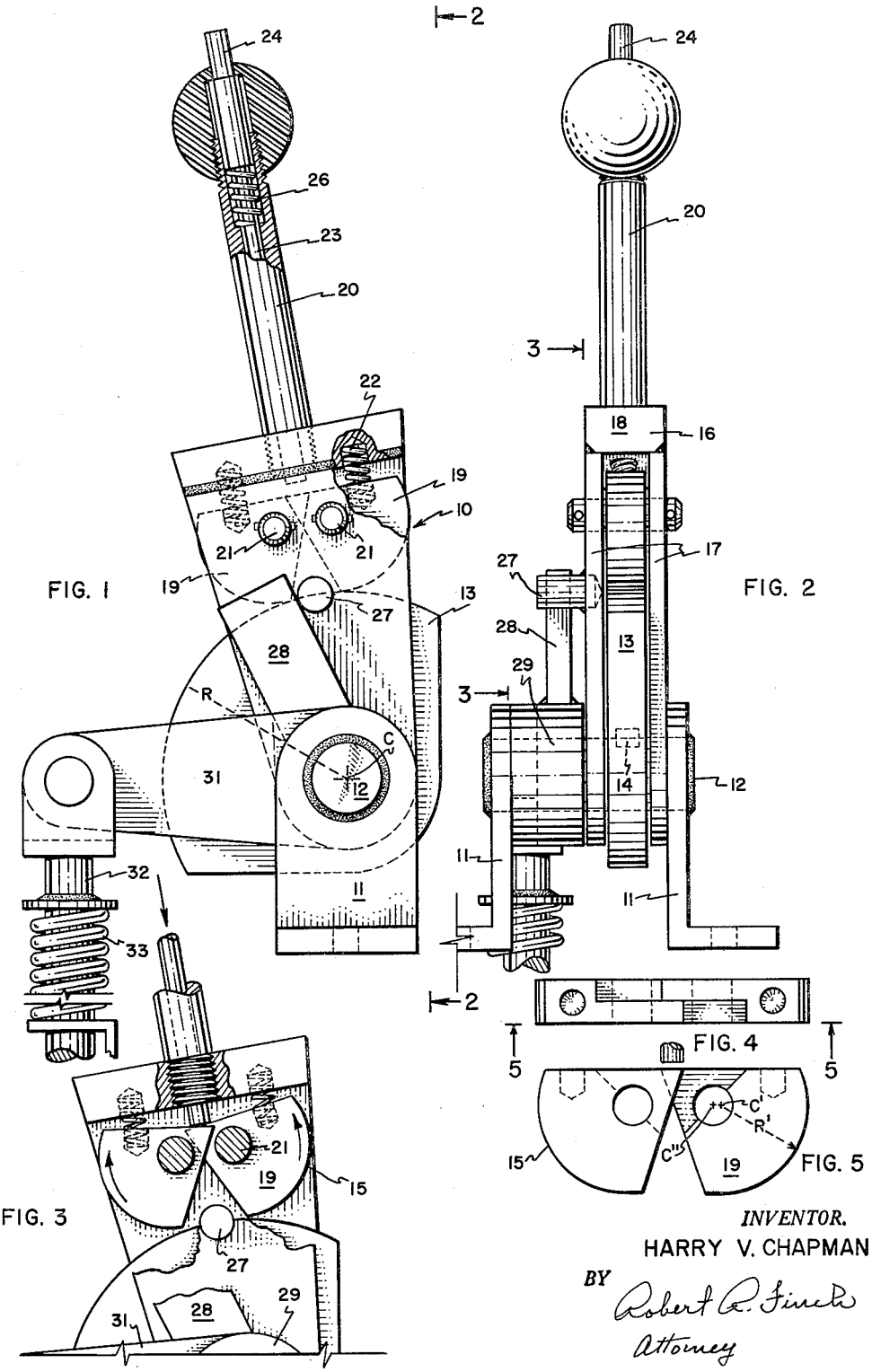
INVENTOR.
HARRY V. CHAPMAN
BY Robert A. Finch
Attorney 3,048,052
LOCKABLE ACTUATING LEVER
Harry V. Chapman, Salt Lake City, Utah, assignor to The Eimco Corporation, Salt Lake City, Utah, a corporation of Delaware
Filed Feb. 6, 1961, Ser. No. 87,318
1 Claim. (Cl. 74—531)

This invention relates generally to actuating levers such as hand throttles, and in particular to an improved structure especially adapted for use under conditions of extreme vibration.

It is the primary object of the invention to provide a simple structure manipulatable by hand to be unlocked to transmit motion and to otherwise automatically remain locked in any of an infinite number of positions.

A further object is to provide a structure of a type described that is simple of construction and assembly yet sufficiently rugged to withstand industrial abuse.

In order that the invention may be more readily understood and carried into effect, reference is made to the accompanying drawing and the following description thereof which is to be taken as illustrative only and not in limitation of the invention, the scope of which is defined by the appended claim.

In the drawing:

FIG. 1 is a side elevational view of an assembly embodying the invention, certain portions being shown in section and other elements by dotted lines for purposes of clarity.

FIG. 2 is a view taken as looking in the direction of arrows 2 in FIG. 1.

FIG. 3 is a view taken in the plane of lines 3—3 of FIG. 2, certain elements being omitted and others partially cut away for purposes of clarity.

FIG. 4 is a top view of locking clutches utilized in the illustrated embodiment.

FIG. 5 is a view taken as looking in the direction of lines 5—5 of FIG. 4.

In the drawings, there is shown base assembly generally designated 10 and comprising spaced apart rigid bracket members 11 which may in turn be mounted on a structure such as a vehicle. A shaft 12 interconnects the two bracket members 11 and is rigidly secured thereto as by welding to prevent rotation of the shaft relative to the bracket. Also mounted on the shaft 12 and forming part of the base is a fixed cam or clutch member 13 which is keyed to the shaft as at 14 to be rigid with respect to the base. The cam 13 is formed as a segment of a true circle of suitable radius R about a center C on the base.

Mounted for movement relative to the bracket members 11 and shaft 12 is a lever arrangement which includes a moveable bracket 16 comprising spaced apart side sections 17 and a top piece 18. The bracket is rotatably mounted on the shaft to straddle the fixed cam 13 and pivot about center C.

Two locking cams or clutch members 19 are pivotally mounted in an upper portion of the moveable bracket 16 on pins 21. The clutch members are pivotally mounted for an offset swinging. That is to say, upon swinging in one direction toward the fixed cam 13 their outer arcuate surface sectors 15 move toward and into engagement with the arcuate surface sector of the fixed cam; and upon swinging in the opposite direction move out of contact therewith. Such clutch members are resiliently loaded by springs 22 positioned to act between the top 18 and the clutches and mounted outboard of pins 21 to normally urge the clutch members into surface to surface contact with the fixed cam thus providing an automatic lock.

In order to effect the offset swinging, the clutch members 19 are formed as segments of a true circle of radius R' about a second center C' on the clutch members, but are mounted to pivot about an offset third center C'' to give the effect of an eccentric. Thus, inward motion increases the locking pressure between the moveable clutches 19 and the fixed cam 13.

A handle 20 extends upwardly from the top piece 18 and is equipped with a manually actuatable rod 23 which may be depressed, as by button 24, against the upward resistance of a second spring 26 to move the lower end of the rod into contact with the upper surfaces of both clutch members 19 on the opposite side of the pivot pins from the locking springs 22. This action pivots the clutch members outwardly away from the fixed cam against the urging of springs 22 thus freeing the lever assembly for movement.

In the normal condition, when no pressure is applied to button 24, rod 23 is in the upper position and the springs 22 urge the clutch members 19 into contact with the fixed cam 13 thus locking the lever assembly against movement in either direction. This is a positive lock because movement in either direction serves to further tighten the clutch on the leading side of the attempted movement. Since the locking action works equally against movement in either direction, vibration cannot affect setting of the handle.

In the embodiment illustrated, motion of the lever assembly is transmitted by a stop pin 27 (fixed to one of the sides 17) to a lever arm 28 in turn secured to a rotatable hub 29 mounted on the shaft 12. A second lever 31 is also attached to the hub and eventually transmits motion to a pivotally mounted rod 32. The rod 32 is spring loaded, as by spring 33, to urge the first lever 28 against the stop pin 27. This is an advantageous arrangement in certain throttle systems whereby the throttle is useable to provide a minimum setting. In such a system, when the lever assembly is locked in a given position, the stop pin 27 blocks the lever 28 and its associated members 31 and 32 against movement in one direction, but permits movement in the opposite direction, as by a foot throttle, away from the stop pin against the force of resilient spring 33. Upon release of pressure, the rod 32 returns to a position determined by the stop pin 27 blocking further retreat.

If it is desired to employ a positive lock in both directions and not permit overriding as previously described, it is only necessary to make a fixed connection between the lever 28 and the stop pin 27. This can be simply accomplished by providing a bore in lever 28 to accommodate the stop pin.

The moveable clutch members are further illustrated in FIGS. 4 and 5. It will be noted that they are mating parts and mounted in overlapping relationship at their inner ends so as to occupy minimum space and to insure that both contact the fixed cam 13 in the same plane thus contributing further to rigidity of the locking action.

FIG. 3 illustrates action of the clutch members upon depressing button 24.

From the foregoing it will be seen that the structure envisioned by this invention is simple in construction yet provides a positive lock especially adaptable to uses wherein vibration is encountered. The invention takes advantage of simple lever action for the locking and unlocking. This enables unlocking for movement by the application of only light pressure.

I claim:

In a movement control device of the type including a lever assembly and linkage interconnecting said lever assembly with the member to be moved, the improved construction enabling selective locking of said member in any of an infinite number of positions, said construction comprising a base, a fixed member mounted on said base and having an arcuate surface sector defined by a radius rotating about a first center located on said base, means mounting said lever for pivotal movement about said first center, a pair of movable clutch members each of which has an arcuate surface sector defined by a radius rotating about a second center located on said clutch member, a pair of pivotal mounting means spaced apart and separately mounting each of said clutch members on said lever for rotational movement about a third center on each clutch member offset from said center of said clutch member to enable movement of said second center and said arcuate surface sector of each of said clutch members about said third center toward and away from said arcuate surface sector of said fixed member, separate resilient means independently engaging each of said clutch members on opposite sides of said pivotal mounting means to normally pivotally urge said arcuate surface of each of said clutch members toward and into engagement with said arcuate surface of said fixed member, said clutch members being in overlapping face-to-face relationship in at least a portion of the space between said spaced apart pivotal mounting means, and a single push rod associated with said lever and mounted to simultaneously engage the overlapping portions of both of said clutch members to rotate said clutch members simultaneously in a direction opposite to and against the urging of said separate resilient means.

References Cited in the file of this patent

UNITED STATES PATENTS

| | | |
|---|---|---|
| 678,252 | Handley | July 9, 1901 |
| 2,020,005 | Smith | Nov. 5, 1935 |
| 2,159,821 | Sandberg et al. | May 23, 1939 |
| 2,527,774 | Stieger | Oct. 31, 1950 |

FOREIGN PATENTS

| | | |
|---|---|---|
| 6,078 of 1885 | Great Britain | May 18, 1885 |